US008599398B2

(12) United States Patent
Matsunoshita

(10) Patent No.: US 8,599,398 B2
(45) Date of Patent: Dec. 3, 2013

(54) EMBEDDING MULTIPLE COPY-RESTRICTION IMAGES THAT ARE RESPECTIVELY DETECTABLE BY MULTIPLE COPYING DEVICES

(75) Inventor: Junichi Matsunoshita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 373 days.

(21) Appl. No.: 12/872,804

(22) Filed: Aug. 31, 2010

(65) Prior Publication Data

US 2011/0205571 A1 Aug. 25, 2011

(30) Foreign Application Priority Data

Feb. 23, 2010 (JP) ................................ 2010-036985

(51) Int. Cl.
*G06K 15/00* (2006.01)

(52) U.S. Cl.
USPC ........................................................ 358/1.14

(58) Field of Classification Search
USPC ........................................................ 358/1.14
See application file for complete search history.

(56) References Cited

U.S. PATENT DOCUMENTS

2002/0054317 A1* 5/2002 Matsunoshita et al. ...... 358/1.14
2003/0179399 A1 9/2003 Matsuoshita
2008/0316538 A1 12/2008 Saito

FOREIGN PATENT DOCUMENTS

JP 2003-280469 A 10/2003
JP 2007-014023 A 1/2008
JP 2008-199622 A 8/2008
JP 2009-004990 A 1/2009

* cited by examiner

*Primary Examiner* — Benny Tieu
*Assistant Examiner* — Eric A Rust
(74) *Attorney, Agent, or Firm* — Sughrue Mion, PLLC

(57) ABSTRACT

An image processing device includes an acceptance section, an information acquisition section, a generating section, and an output section. The acceptance section accepts image data to be processed. The information acquisition section acquires plural pieces of information relevant to copy-restriction images and corresponding to plural kinds of copying devices configured to detect corresponding copy-restriction images. A target image is prevented from copying when a given piece of the information corresponding to a given kind of the copying devices and embedded in the target image is detected by the given kind of the copying devices. The generating section generates a formation-target image by embedding, in the image data, the copy-restriction images corresponding to the plural piece of information acquired by the information acquisition section. The output section outputs the formation-target image generated by the generating section.

22 Claims, 5 Drawing Sheets

EMBEDDING MULTIPLE COPY-RESTRICTION IMAGES THAT ARE RESPECTIVELY DETECTABLE BY MULTIPLE COPYING DEVICES

CROSS-REFERENCE TO RELATED APPLICATIONS

This application is based upon and claims priority under 35 USC 119 from Japanese Patent Application No. 2010-036985, filed Feb. 23, 2010.

BACKGROUND

Technical Field

The present invention relates to an image processing device, an image processing system, a computer readable medium.

SUMMARY OF THE INVENTION

According to an aspect of the invention, an image processing device includes an acceptance section, an information acquisition section, a generating section, and an output section. The acceptance section accepts image data to be processed. The information acquisition section acquires plural pieces of information relevant to copy-restriction images and corresponding to plural kinds of copying devices configured to detect corresponding copy-restriction images. A target image is prevented from copying when a given piece of the information corresponding to a given kind of the copying devices and embedded in the target image is detected by the given kind of the copying devices. The generating section generates a formation-target image by embedding, in the image data, the copy-restriction images corresponding to the plural piece of information acquired by the information acquisition section. The output section outputs the formation-target image generated by the generating section.

BRIEF DESCRIPTION OF THE DRAWINGS

Exemplary embodiments of the invention will be described in detail based on the following figures, wherein.

DETAILED DESCRIPTION

An exemplary embodiment of the invention will be described below in detail with reference to the drawings.

Figure 1:
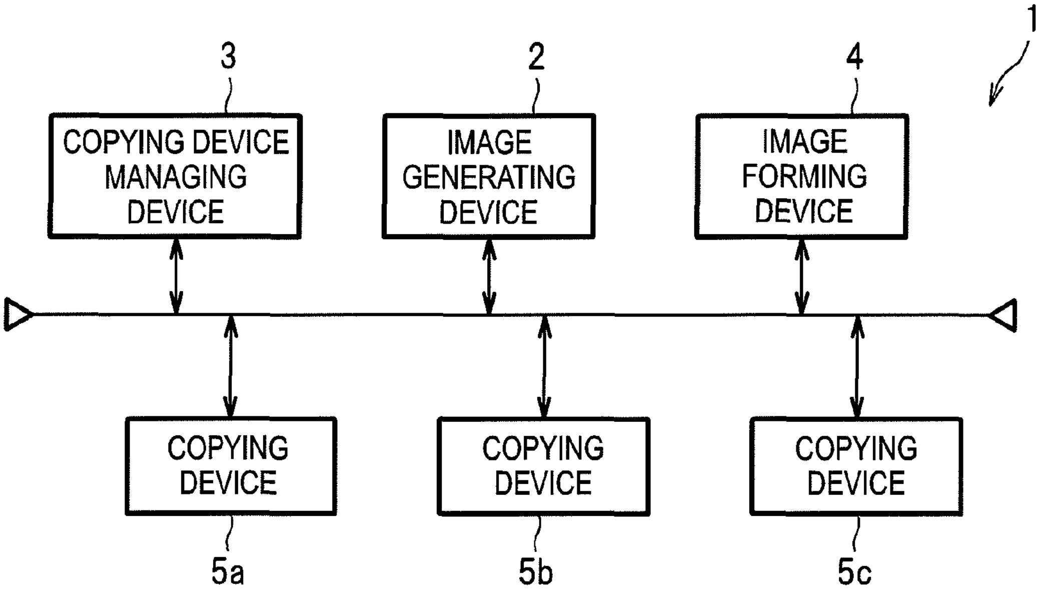
FIG. 1 is a schematic diagram showing the overall outline of an image processing system including an image generating device according to an exemplary embodiment of the invention.

FIG. 1 is a schematic diagram showing the overall outline of an image processing system 1 including an image generating device 2 according to this exemplary embodiment. The image processing system 1 includes an image generating device 2, a copying device managing device 3, an image forming device 4, and copying devices 5. These devices are connected to one another through communication means (assumed to be a local area network in a company), so that these devices perform data communication with one another.

The image generating device 2 is an image processing device such as a personal computer. The image generating device 2 generates an image (formation-target image) to be formed by the image forming device 4 or one of the copying devices 5, in accordance with a user's instruction, and outputs the image to the image forming device 4 or one of the copying devices 5. The configuration and function of the image generating device 2 in the exemplary embodiment will be described later.

The copying device managing device 3 is an information processing device such as a server computer. The copying device managing device 3 acquires and manages information concerned with the respective copying devices 5 included in the image processing system 1 and connected to the image forming device 4 and the copying device managing device 3 through the communication means. The function of the copying device managing device 3 will be described later.

The image forming device 4 is a printer etc. The image forming device 4 performs an image forming process by which a formation-target image inputted from the image generating device 2 is formed on a recording medium such as a sheet of paper.

The copying devices 5 are copying machines etc. Each of the copying devices 5 performs a copying process for reading an image (copy-target image) formed on a recording medium such as a sheet of paper, and forming the read copy-target image on another recording medium. This exemplary embodiment has been described in the case where the image to be copied by each copying device 5 is an image formed on a recording medium by the image forming device 4 or one of the copying devices 5. A code image for copy restriction (hereinafter referred to as copy-restriction image) may be included in the copy-target image. The copy-restriction image is an image embedded in the copy-target image and detected by each copying device 5 to thereby restrict the copying device 5 from copying the copy-target image in which the copy-restriction image is embedded. For example, the copy-restriction image is a two-dimensional code image or electronic watermark image in which information expressing copy restriction is embedded, or a repetitive pattern image indicating copy restriction. When each copying device 5 receives an instruction to copy a copy-target image formed on a recording medium from a user, the copying device 5 first reads the copy-target image and determines whether there is any copy-restriction image included in the read copy-target image or not. When there is any copy-restriction image detected from the copy-target image, the copying device 5 restricts copying of the copy-target image and discontinues the copying process.

Further, in this exemplary embodiment, different types of copying devices 5 (i.e. different in model or maker) are installed in the image processing system 1. These copying devices 5 use different types of copy-restriction images as subjects of read restriction. Assume hereinafter a specific example in which three copying devices 5$a$, 5$b$ and 5$c$ are included in the image processing system 1 so that the copying device 5$a$ uses a copy-restriction image Ia as a subject of detection, the copying device 5$b$ uses a copy-restriction image Ib as a subject of detection, and the copying device 5$c$ uses a copy-restriction image Ic as a subject of detection. When, for example, only the copy-restriction image Ia is included in a copy-target image, the copying device 5$a$ restricts copying of the copy-target image because the copying device 5$a$ uses the copy-restriction image Ia as a subject of detection. The copying devices 5$b$ and 5$c$ may however copy the copy-target image as it is because the copying devices 5$b$ and 5$c$ do not use the copy-restriction image Ia as a subject of detection.

Incidentally, in this exemplary embodiment, each copying device 5 executes not only a process of copying an image formed on a medium but also an image forming process in the same manner as in the image forming device 4. That is, when the image generating device 2 accepts an image forming instruction from a user, the image generating device 2 controls any one of the image forming device 4 and the copying devices 5 to execute an image forming process.

Figure 2:
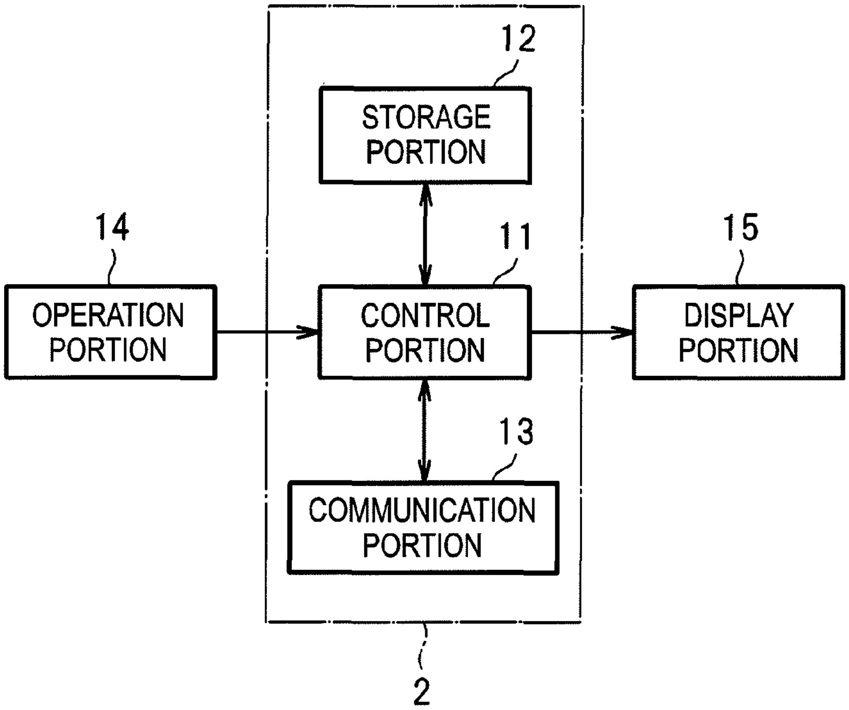
FIG. 2 is a configuration diagram showing the schematic configuration of the image generating device according to the exemplary embodiment of the invention.

The hardware configuration of the image generating device 2 will be described here. As shown in FIG. 2, the image generating device 2 includes a control portion 11, a storage portion 12, and a communication portion 13. The image generating device 2 is connected to an operation portion 14 and a display portion 15.

The control portion 11 is a program control device such as a CPU, which executes various types of information processing in accordance with programs stored in the storage portion 12.

The storage portion 12 includes memory elements such as an RAM and an ROM. The storage portion 12 stores programs executed by the control portion 11 and various types of data. The storage portion 12 serves also as a work memory for the control portion 11. Particularly in this exemplary embodiment, the storage portion 12 stores information (hereinafter referred to as candidate copy-restriction image information) concerned with copy-restriction images (candidate copy-restriction images) used as subjects of detection by various types of commonly known copying devices. For example, the candidate copy-restriction image information may be image data of candidate copy-restriction images or may be information (such as information for defining patterns of candidate copy-restriction images) used for generation of candidate copy-restriction images. Incidentally, the candidate copy-restriction image information is prepared not only for the copy-restriction images Ia, Ib and Ic used as subjects of detection by the respective copying devices 5 included in the image processing system 1 but also for various types of copy-restriction images used as subjects of detection by other copying devices not included in the image processing system 1.

The communication portion 13 is a communication interface such as an LAN card. The communication portion 13 performs data communication with the copying device managing device 3, the image forming device 4, the copying devices 5, etc. through the communication means.

For example, the operation portion 14 is a keyboard, a mouse, etc. The operation portion 14 is used by a user of the image generating device 2 when the user issues various kinds of instructing operations to the image generating device 2. Information indicating contents of an instructing operation accepted from the user by the operation portion 14 is outputted to the control portion 11. The display portion 15 is a liquid crystal display, etc. The display portion 15 displays various types of images in accordance with instructions given from the control portion 11 to present the images to the user.

The function implemented by the image generating device 2 will be described next. When an instruction to form a copy-restriction image-embedded image and a designation of a destination image forming device (any one of the image forming device 4 and the copying devices 5) are accepted from the user, the image generating device 2 acquires types of copy-restriction images (hereinafter referred to as embedding copy-restriction images) to be embedded in the formation-target image. Then, the image generating device 2 generates a formation-target image by embedding the acquired embedding copy-restriction images in the original image designated by the user, and outputs the formation-target image to the image forming device which is a destination device. Upon reception of the formation-target image, the image forming device forms the formation-target image having the types of copy-restriction images embedded therein on a recording medium such as a sheet of paper.

Figure 3:
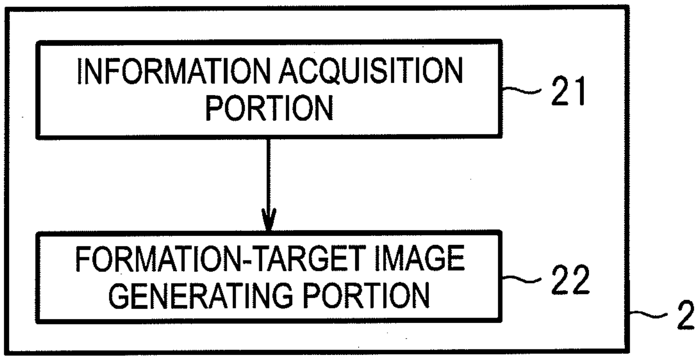
FIG. 3 is a functional block diagram showing functions implemented by the image generating device according to the exemplary embodiment of the invention.

As shown in FIG. 3, the image generating device 2 functionally includes an information acquisition portion 21, and a formation-target image generating portion 22. These functions are implemented by the control portion 11 which executes a program stored in the storage portion 12. This program may be a device driver program for the image forming device. This program may be provided to the image generating device 2 in a state where this program is stored in any type of computer-readable information storage medium such as an optical disk or may be provided to the image generating device 2 through communication means such as the Internet.

The information acquisition portion 21 acquires information concerned with types of copy-restriction images to be detected by different types of copying devices respectively, as information of embedding copy-restriction images. Specifically, the information acquisition portion 21 may acquire image data of types of copy-restriction images to be detected by the respective copying devices 5 connected to the image generating device 2 through the communication means, as embedding copy-restriction images. As described above, in the image processing system 1 according to this exemplary embodiment, the three copying devices 5$a$ to 5$c$ are connected to the image generating device 2. Because these copying devices 5$a$ to 5$c$ use copy-restriction images Ia, Ib and Ic as subjects of detection respectively, these three types of copy-restriction images Ia to Ic are acquired as embedding copy-restriction images. The information acquisition portion 21 may acquire information used for generation of copy-restriction images as information concerned with the copy-restriction images, instead of acquiring the copy-restriction images per se. As the information used for generation of such copy-restriction images, there is information etc. in which pattern images including lumps of pixels are arranged according to a predetermined rule. Specifically, the information may be such information that pattern images indicating specific information according to combinations of dots as constituent elements are arranged according to a predetermined rule, or may be such information that specific information is embedded according to the direction of displacement of each dot from a virtual grid.

In this exemplary embodiment, the information acquisition portion 21 inquires of the copying device managing device 3 connected through the communication means, about the types of copy-restriction images to be detected by the copying devices 5 existing in the image processing system 1. The information acquisition portion 21 specifies the types of embedding copy-restriction images by receiving a response to the inquiry from the copying device managing device 3.

The information acquisition portion 21 further acquires embedding copy-restriction images by reading information used for generation of the types of copy-restriction images specified as embedding copy-restriction images from the candidate copy-restriction image information stored in the storage portion 12. Incidentally, when any one of the copying devices 5 is designated as a destination image forming device by the user, the information acquisition portion 21 always selects a copy-restriction image to be detected by the copying device 5 designated as a destination copying device, as an embedding copy-restriction image. In this case, the information acquisition portion 21 inquires of the copying device managing device 3 whether there is any copy-restriction image to be selected as another embedding copy-restriction image or not. When information concerned with types of copy-restriction images not to be detected by the destination copying device 5 is stored in the copying device managing device 3, the information acquisition portion 21 receives a response indicating this fact and selects embedding copy-restriction images. On the other hand, when information concerned with other copy-restriction images is not stored in the copying device managing device 3, the information acquisition portion 21 selects only the copy-restriction image to be detected by the destination copying device 5, as an embedding copy-restriction image.

To achieve such processing, the copying device managing device 3 specifies the type of each copying device 5 connected to the copying device managing device 3 through the communication means and stores information indicating the type (e.g. model name, model number, maker name, etc). As a specific example, the copying device managing device 3 sends an inquiry about acquisition of type information of each connected device to all network-connected devices in the same segment by broadcast transmission. For example, this inquiry may be a request to acquire MIB (Management Information Base). Then, the copying device managing device 3 acquires information concerned with the type of each copying device 5 connected to the copying device managing device 3 by referring to contents of a response of each network-connected device to this inquiry. The copying device managing device 3 sends this inquiry periodically to thereby continuously update information indicating the type of each copying device 5 stored in the copying device managing device 3 so that the latest state is reflected even when the type of any copying device 5 connected to the copying device managing device 3 is changed (when a new type copying device 5 is connected, when a copying device 5 heretofore installed is removed, etc.).

The copying device managing device 3 functions also as a storage device which stores information concerned with correspondence between copy-restriction images and the types of copying devices. Specifically, the copying device managing device 3 stores information indicating the type of each copying device using a type of copy-restriction image to be detected, in accordance with each of various types of commonly known copy-restriction images (i.e. candidate copy-restriction images whose candidate copy-restriction image information is stored in the storage portion 12 of the image generating device 2). Upon reception of an inquiry from the image generating device 2, the copying device managing device 3 specifies the types of copy-restriction images to be detected by the copying devices 5 in the image processing system 1 by referring to information indicating the types of the copying devices 5 in the image processing system 1 and information indicating the types of the copying devices using various types of copy-restriction images to be detected, and sends information indicating the specified types of the copy-restriction images back to the image generating device 2. The image generating device 2 specifies the copy-restriction images notified by the copying device managing device 3 as embedding copy-restriction images.

Then, the formation-target image generating portion 22 embeds the types of embedding copy-restriction images acquired by the information acquisition portion 21 in one original image to thereby generate a formation-target image to be formed by the image forming device designated as a destination device. The original image is an image which is designated by the user and which indicates contents that the user wants to print. The formation-target image generating portion 22 outputs the generated formation-target image to the image forming device (the image forming device 4 or any one of the copying devices 5) designated as a destination device by the user. As a result, the formation-target image generated by the formation-target image generating portion 22 is formed on a recording medium such as a sheet of paper.

Specifically, the formation-target image generating portion 22 generates a formation-target image by type-by-type embedding at least one of the types of embedding copy-restriction images in regions (split regions) obtained by splitting the original image. Copy-restriction images for restricting copying are classified into two types, that is, a type of arranging a plurality of copy-restriction images (as repetitive patterns) in a region having a certain size and a type of embedding only one copy-restriction image without repetition. The former example shows copy-restriction images which are formed in such a manner that unit images such as dot images (dot patterns) or oblique line images are arranged according to a predetermined rule. This type copy-restriction images are embedded as repetitive patterns in a background region (blank region) of the original image. The latter example shows two-dimensional bar-code images such as QR code (registered trademark). As for copy-restriction images of the non-repetitive type such as QR code among embedding copy-restriction images, the formation-target image generating portion 22 embeds only one copy-restriction image in any position (e.g. an upper right corner) in the original image or embeds a plurality of copy-restriction images in separate positions (e.g. an upper right corner and a lower left corner) in the original image. As for copy-restriction images of the type embedded as repetitive patterns, the formation-target image generating portion 22 embeds types of copy-restriction images type-by-type in split regions of the original image respectively as described above. In this manner, a formation-target image including types of copy-restriction images embedded in one original image is generated.

Figure 4:
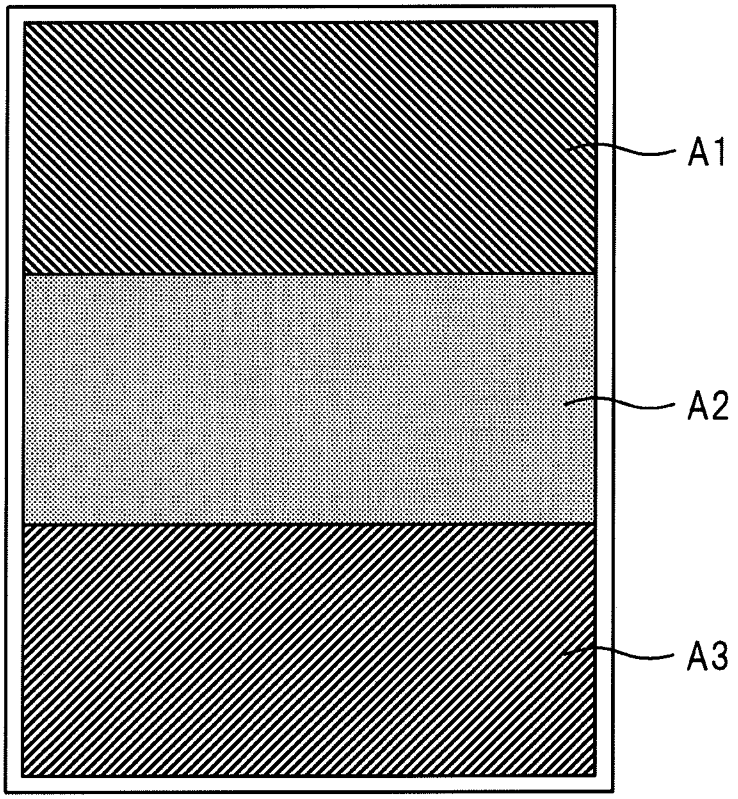
FIG. 4 is a view showing an example of a formation-target image generated by the image generating device according to the exemplary embodiment of the invention.

FIG. 4 is a view typically showing an example of the formation-target image generated as described above. Incidentally, contents of the original image per se are not shown in FIG. 4. In the example shown in FIG. 4, the original image is split into three split regions A1, A2 and A3 by two boundary lines extending horizontally linearly. A copy-restriction image Ia is arranged as a repetitive pattern in a background region of the split region A1. A copy-restriction image Ib is arranged as a repetitive pattern in a background region of the split region A2. A copy-restriction image Ic is arranged as a repetitive pattern in a background region of the split region A3. Each copying device 5 makes retrieval as to whether there is any copy-restriction image to be detected by the copying device 5 itself or not, while reading all copy-restriction images successively from end to end. For this reason, when a recording medium having a formed image in which three types of copy-restriction images Ia, Ib and Ic are embedded is a subject of copying, each of the copying devices **5*a*, 5*b* and 5*c*** using the copy-restriction images Ia, Ib and Ic respectively as subjects of detection detects the copy-restriction images from the image formed on the recording medium in order to restrict copying of the image.

Figure 5:
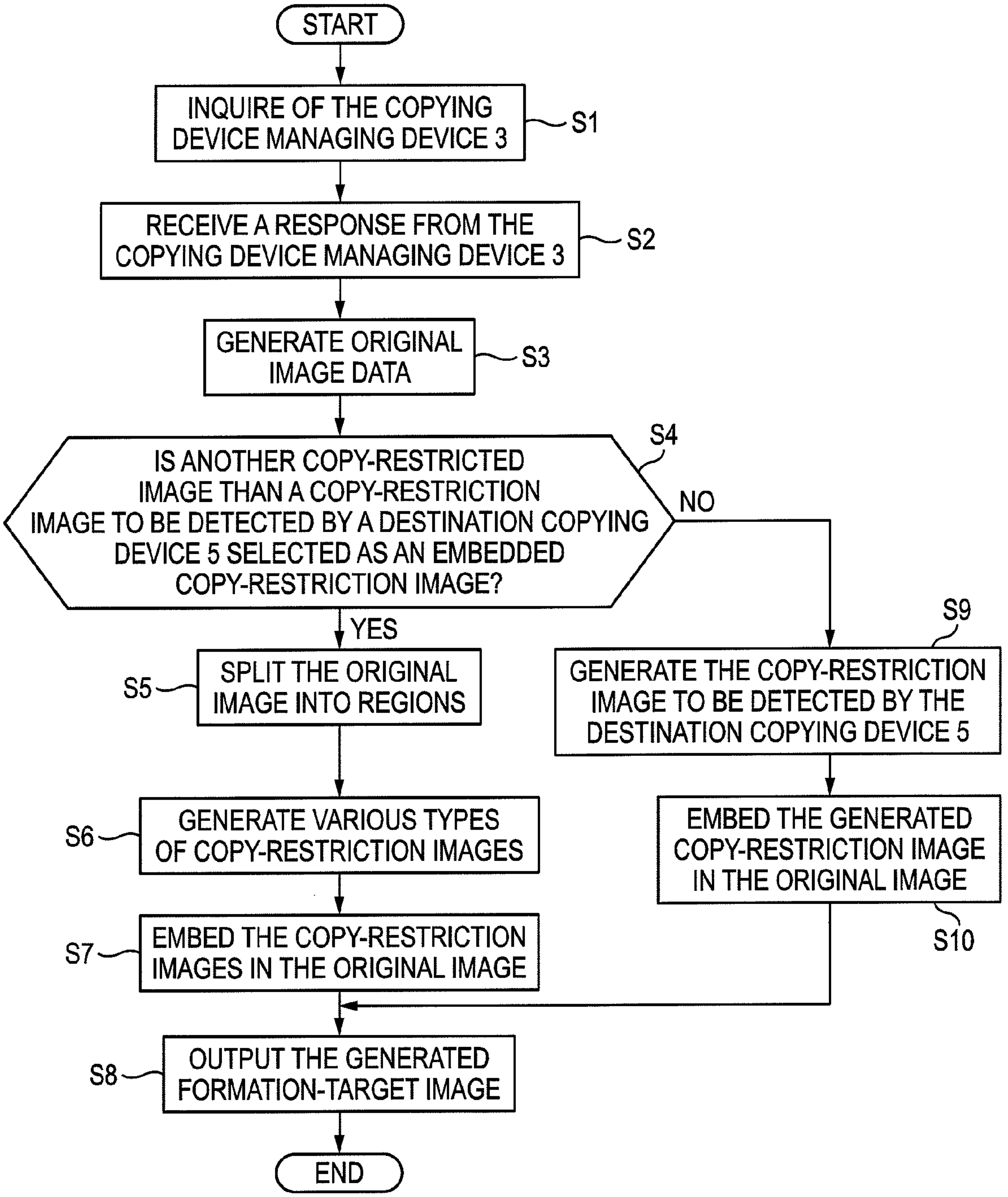
FIG. 5 is a flow chart showing an example of a flow of processing executed by the image generating device according to the exemplary embodiment of the invention.

A specific example of a flow of processing executed by the image generating device 2 according to this exemplary embodiment will be described here based on a flow chart shown in FIG. 5. This processing is implemented by the control portion 11 executing a program stored in the storage portion 12.

Upon acceptance of an instruction to form an image having copy-restriction images embedded therein for restricting copying and a designation of a destination image forming device from the user, the image generating device 2 first sends an inquiry about the types of copy-restriction images to be embedded in a formation-target image to the copying device managing device 3 (S1). Upon reception of a response to this inquiry from the copying device managing device 3, the image generating device 2 specifies the types of embedding copy-restriction images (S2). On this occasion, when pieces of information concerned with types of copy-restriction images is stored in the copying device managing device 3, the image generating device 2 specifies the types of embedding copy-restriction images based on the pieces of information included in the response from the copying device managing device 3. On the other hand, when any one of the copying devices 5 is designated as a destination copying device and information concerned with other copy-restriction images than the copy-restriction image to be detected by the designated copying device 5 is not stored in the copying device managing device 3, the information acquisition portion 21 selects only the copy-restriction image to be detected by the destination copying device 5 as an embedding copy-restriction image.

Successively, the image generating device 2 generates original image data (PDL-format image data in this example) allowed to be processed by the destination image forming device, based on document data as a formation target of an image designated by the user (S3).

The processing then branches into the case where any one of the copying devices 5 is designated as a destination copying device by the processing of the step S2 and other copy-restriction images than the copy-restriction image to be detected by the designated copying device 5 are selected as embedding copy-restriction images (S4:Y) and the other case (S4:N). When types of copy-restriction images are specified as embedding copy-restriction images, the image generating device 2 then splits the original image into split regions in accordance with the number of types of copy-restriction images embedded as repetitive patterns among the types of the embedding copy-restriction images specified by the step S2 (S5). The image generating device 2 then refers to candidate copy-restriction image information stored in the storage portion 12 to thereby generate respective image data of the types of embedding copy-restriction images specified by the step S2 (S6).

Successively, the image generating device 2 embeds the types of copy-restriction images generated by the step S6 either in the split regions obtained by the step S5 or in predetermined positions of the original image, respectively (S7). As a result, the types of embedding copy-restriction images are combined with the original image to thereby generate a formation-target image. Finally, the image generating device 2 outputs data of the formation-target image generated by the step S7 to the designation image forming device and instructs the image forming device to print (S8).

On the other hand, when other copy-restriction images than the copy-restriction image to be detected by the destination copying device 5 are not selected as embedding copy-restriction images by the step S4, the image generating device 2 generates image data of the copy-restriction image to be detected by the destination copying device 5 (S9) and embeds the generated copy-restriction image in an overall background region of the original image to thereby generate a formation-target image (S10). Then, the image generating device 2 outputs the generated formation-target image to the destination copying device 5 (S8).

Incidentally, a flow for only one formation-target image, for example, in the case of printing of a document corresponding to one page has been described above. However, when a document corresponding to a plurality of pages is designated as a subject of printing by the user, the image generating device 2 may generate an original image based on a document corresponding to each page and embed types of copy-restriction images in the generated original image. That is, when the processing of the steps S3 to S6 is executed on each of original images corresponding to the pages, data of formation-target images each having the types of copy-restriction images embedded according to each page are generated.

Although description has been made in the case where each of the copying devices 5 in the image processing system 1 uses only one type of copy-restriction image as a subject of detection differently from any other copying device 5, the type of copy-restriction image to be detected by each copying device 5 is not limited to this case. For example, it may be considerate that some of copying devices provided by makers use a predetermined copy-restriction image (hereinafter referred to as common copy-restriction image Id) as a subject of detection. This common copy-restriction image Id is defined so that a copy-restriction image as a subject of detection is used in common to different types of copying devices. When each of the copying devices 5 existing in the image processing system 1 uses the common copy-restriction image Id as a subject of detection, only the common copy-restriction image Id may be embedded as an embedding copy-restriction image in a formation-target image so that copying of the formation-target image is restricted in any copying device 5. Therefore, the image generating device 2 may store information concerned with the common copy-restriction image Id as one piece of candidate copy-restriction image information, so that only the common copy-restriction image Id is embedded in the original image to generate a formation-target image when each of the copying devices 5 connected to the image generating device 2 uses the common copy-restriction image Id as a subject of detection.

When a part of copying devices 5 use the common copy-restriction image Id as a subject of detection but the other part of copying devices 5 do not support the common copy-restriction image Id, the information acquisition portion 21 may select copy-restriction images to be detected by the copying devices 5 not supporting the common copy-restriction image Id, as embedding copy-restriction images in addition to the common copy-restriction image Id. In this case, with respect to a copying device 5 using either of the common copy-restriction image Id and a unique-format copy-restriction image as subjects of detection, the common copy-restriction image Id is preferentially acquired as an embedding copy-restriction image but the unique copy-restriction image is not selected as a subject of embedding. In this manner, the number of types of embedding copy-restriction images embedded in the original image is reduced.

Moreover, also in the case where each of the copying devices 5 in the image processing system 1 does not use the common copy-restriction image Id as a subject of detection, the information acquisition portion 21 may acquire the common copy-restriction image Id as an embedding copy-restriction image in addition to copy-restriction images to be detected by the copying devices 5. In this case, the image generating device 2 generates a formation-target image so that the common copy-restriction image Id is always included in embedding copy-restriction images when an instruction to form an image having copy-restriction images embedded therein is received from the user. In this manner, copying of the image formed by the image forming device is restricted not only in the copying devices 5 in the image processing system 1 but also in other copying devices 5 supporting the common copy-restriction image Id.

Figure 6:
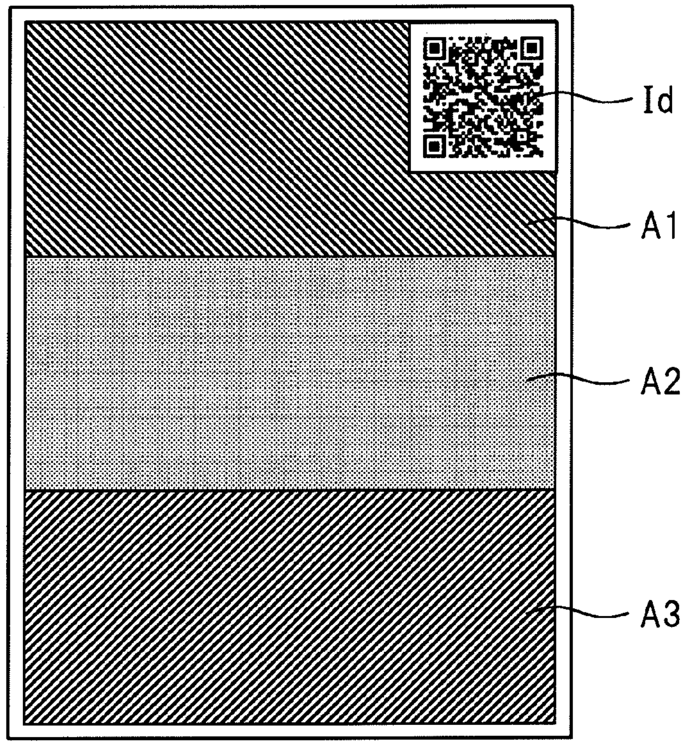
FIG. 6 is a view showing another example of the formation-target image generated by the image generating device according to the exemplary embodiment of the invention.

FIG. 6 is a view showing an example of a formation-target image having the common copy-restriction image Id embedded therein in addition to the unique-format copy-restriction images Ia, Ib and Ic to be detected by the copying devices 5*a*, 5*b* and 5*c* respectively. In the example shown in FIG. 6, the common copy-restriction image Id is one QR code. The other copy-restriction images Ia, Ib and Ic are embedded type-by-type in split regions A1, A2 and A3 respectively, like the example shown in FIG. 4.

In the above description, the formation-target image generating portion 22 splits the original image by dividing equally the original image along horizontally extending lines when split regions in which copy-restriction images each composed of a repetitive pattern should be embedded are generated. However, the method of generating split regions by dividing the original image is not limited thereto. For example, the formation-target image generating portion 22 may divide the original image along vertically extending lines or may generate a necessary number of split regions by dividing the original image like a grid with use of both vertically extending lines and horizontally extending lines as boundary lines. Alternatively, the original image may be divided not along lines but along curves to make the boundary lines between the split regions inconspicuous.

In addition, the formation-target image generating portion 22 may determine the area and position of each split region in which a copy-restriction image composed of a repetitive pattern should be embedded, in accordance with the number of copying devices 5 using the copy-restriction image as a subject of detection. The example described above is placed on the assumption that the number of copying devices 5 using each of the copy-restriction images Ia, Ib and Ic as a subject of detection is one equally. However, the same type copying devices 5 using the same copy-restriction image as a subject of detection may exist in the image processing system 1. When the number of copying devices 5 using a certain copy-restriction image as a subject of detection is larger than the number of copying devices 5 using anther copy-restriction image as a subject of detection, it is particularly preferable that such a copy-restriction image can be detected more accurately than the other copy-restriction image. Therefore, the formation-target image generating portion 22 may embed such a copy-restriction image in a formation-target image so that the copy-restriction image can be detected easily.

As a specific example, with respect to each of types of copy-restriction images composed of repetitive patterns respectively, the formation-target image generating portion 22 determines the area of a split region in which the copy-restriction image should be embedded, in accordance with the number of copying devices 5 using the copy-restriction image as a subject of detection among copying devices 5 connected to the image generating device 2. On this occasion, the areas of split regions are determined in such a manner that the area of a split region in which a copy-restriction image to be detected by a larger number of copying devices 5 is embedded is larger than the area of a split region in which a copy-restriction image to be detected by a smaller number of copying devices 5 is embedded. In this manner, because a copy-restriction image embedded in a split region with a larger area can be detected more easily by copying devices 5, there is a high possibility that the copy-restriction image will be detected accurately by a larger number of copying devices 5. Specifically, when each split region is a horizontally extending belt-like region, for example, as shown in FIG. 4 or 6, the width (vertical height) of each split region may be determined so as to be proportional to the number of copying devices 5 using the copy-restriction image embedded in the split region as a subject of detection.

In addition, with respect to each of types of copy-restriction images composed of repetitive patterns respectively, the formation-target image generating portion 22 determines the position of a split region in which the copy-restriction image should be embedded, in accordance with the number of copying devices 5 using the copy-restriction image as a subject of detection among copying devices 5 connected to the image generating device 2. On this occasion, the position of each split region is determined in such a manner that a copy-restriction image to be detected by a larger number of copying devices 5 is embedded in a split region nearer to the center of the original image while a copy-restriction image to be detected by a smaller number of copying devices 5 is embedded in a split region farther from the center of the original image (i.e. nearer to the outside of the original image). The term "center" means a position of the center sufficient to make detection of the copy-restriction image easy but need not mean a strict position of the center. In this manner, because a copy-restriction image embedded in a split region nearer to the center can be detected more easily by copying devices 5, there is a high possibility that the copy-restriction image will be detected by a larger number of copying devices 5. Alternatively, the formation-target image generating portion 22 may embed copy-restriction images in such a manner that a copy-restriction image to be detected by a larger number of copying devices 5 is embedded in a split region nearer to the head of a document (the upside of the document if the document is a horizontally written document) while a copy-restriction image to be detected by a smaller number of copying devices 5 is embedded in a split region nearer to the foot of the document (the downside of the document if the document is a horizontally written document).

Figure 7:
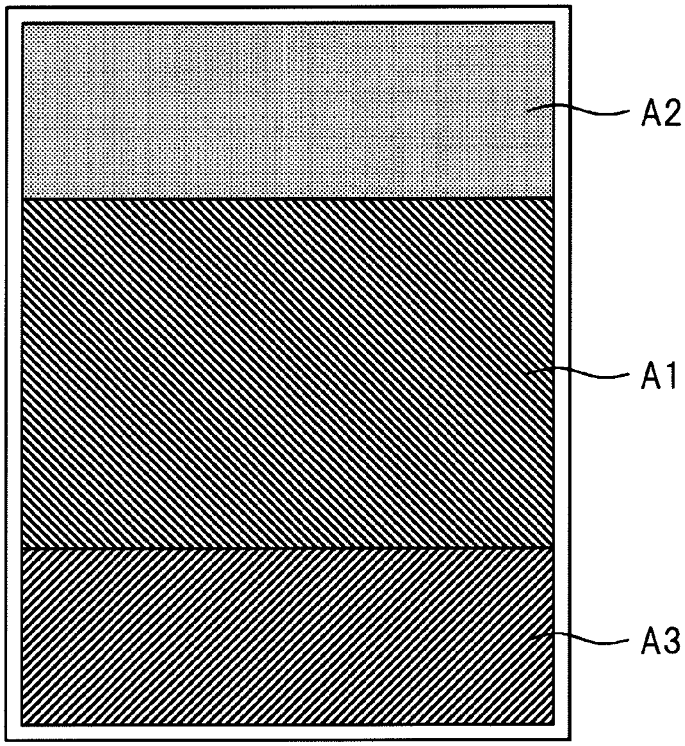
FIG. 7 is a view showing a further example of the formation-target image generated by the image generating device according to the exemplary embodiment of the invention.

FIG. 7 is a view showing an example of the formation-target image generated by the formation-target image generating portion 22 when two copying devices 5 use a copy-restriction image Ia as a subject of detection, one copying device 5 uses a copy-restriction image Ib as a subject of detection, and one copying device 5 uses a copy-restriction image Ic as a subject of detection. In the example shown in FIG. 7, a split region A1 in which the copy-restriction image Ia is embedded is disposed in the center of the formation-target image. The area of the split region A1 is twice as large as that of each of the other split regions A2 and A3.

Incidentally, when a common copy-restriction image Id composed of a repetitive pattern is used as an embedding copy-restriction image, the formation-target image generating portion 22 may embed the common copy-restriction image Id in a split region with a larger area or nearer to the center in place of or in addition to the copy-restriction image to be detected by a larger number of copying devices 5.

Moreover, the formation-target image generating portion 22 may determine the position of a split region in which each copy-restriction image should be embedded, not in accordance with the number of copying devices 5 using the copy-restriction image as a subject of detection but in accordance with the attribute of the copy-restriction image. Specifically, for example, the position of each split region may be determined in such a manner that a copy-restriction image of the type inconspicuous in terms of image quality is embedded in a split region nearer to the center of the original image while a copy-restriction image of the type conspicuous in terms of image quality is embedded in a split region farther from the center of the original image. In this manner, a copy-restriction image of the conspicuous type is prevented from being disposed in a conspicuous position. Incidentally, information indicating conspicuousness of each type of copy-restriction image may be stored so as to be included in candidate copy-restriction image information in advance.

In addition, when various types of copy-restriction images are embedded in split regions, the formation-target image generating portion 22 may embed the various types of copy-restriction images in the original image after the average density of at least one of the various types of copy-restriction images is changed in accordance with the average density of any other type of copy-restriction image. On this occasion, when the average density of a copy-restriction image need be changed, the average density of the copy-restriction image is changed in accordance with the average density of a copy-restriction image (adjacent copy-restriction image) embedded in a split region adjacent to the split region in which the copy-restriction image is embedded. That is, the average density of at least one type of copy-restriction image is changed so as to approach the average density of an adjacent copy-restriction image. In this manner, the average densities of adjacent copy-restriction images get close to each other, so that boundary lines between split regions are made inconspicuous.

Specifically, when each copy-restriction image is generated by repeatedly arranging predetermined unit images including lumps of pixels such as dot patterns or oblique line images, the formation-target image generating portion 22 adjusts the size of each unit image and the distance between adjacent unit images to thereby adjust the average density of the copy-restriction image as a whole. The size of such a unit image and the distance between adjacent unit images are generally predetermined so that the unit image can be detected by each copying device 5. However, on the assumption that the size of each unit image or the distance between adjacent unit images varies within a certain range, each copying device 5 detects the copy-restriction image in spite of such variation in order to detect the copy-restriction image surely. Therefore, by changing the size of each unit image or the distance between adjacent unit images within a predetermined range, the formation-target image generating portion 22 changes the average density of each type of copy-restriction image. For example, the size of a lump of pixels such as a dot pattern or an oblique line image constituting a copy-restriction image is increased to make the average density of the copy-restriction image high. On this occasion, for example, the average density may be adjusted by a pattern dithering method, an error variance method or the like. Specifically, a pattern of a lump of pixels with a size corresponding to a designated density value may be selected or a lump of pixels may be generated in accordance with a growth pattern of dots by a method such as a pattern dithering method to change the size of the lump of pixels, for example, in accordance with a designated density value. Then, the formation-target image generating portion 22 changes the average density of any other type of embedding copy-restriction image, for example, in accordance with a copy-restriction image highest in the initial value of the average density among types of embedding copy-restriction images. Alternatively, copy-restriction images which have been changed in the density may be stored in the storage portion 12 so as to be associated with density information. The term “density information” means information concerned with density such as information concerned with the average density of each copy-restriction image and the size of a lump of pixels constituting each copy-restriction image. Then, the formation-target image generating portion 22 may select and extract copy-restriction images from the storage portion 12 so that the density difference between types of copy-restriction images to be embedded is reduced. Or the formation-target image generating portion 22 may extract copy-restriction images corresponding to the highest initial value of average density in types of copy-restriction images from the storage portion 12. Or the formation-target image generating portion 22 may calculate the average of initial values of average densities in types of copy-restriction images and may select and extract copy-restriction images from the storage portion 12 based on the average. In this manner, the average density difference between copy-restriction images embedded in the background region is absorbed on the whole of the formation-target image so that the background becomes more uniform.

Incidentally, the exemplary embodiment of the invention is not limited to the above description. For example, in the above description, embedding copy-restriction images are copy-restriction images to be detected by copying devices 5 directly communication-connected to the image generating device 2. However, copy-restriction images to be detected by copying devices 5 not directly but indirectly connected to the image generating device 2 through the copying device managing device 3 may be acquired as embedding copy-restriction images. Or copy-restriction images to be detected by only copying devices not connected to the image generating device 2 at all and not included in the image processing system 1 may be acquired as embedding copy-restriction images. In this case, for example, the image generating device 2 uses all copy-restriction images in which candidate copy-restriction image information is stored, as embedding copy-restriction images. In this manner, the possibility that copying due to copying devices outside the image processing system 1 will be restricted becomes high. Alternatively, the image generating device 2 may specify the type of each embedding copy-restriction image by user’s selection. Incidentally, in these cases, the copying device managing device 3 need not be provided.

Although the above description has been made in the case where the image generating device 2 stores candidate copy-restriction image information in the storage portion 12 in advance, candidate copy-restriction image information may be stored in the copying device managing device 3. In this case, the image generating device 2 may inquire of the copying device managing device 3 and receive information concerned with copy-restriction images to be embedded in the formation-target image (information concerned with image data of copy-restriction images per se, the arrangement rule of pattern images used for generation of copy-restriction images, etc.) whenever an instruction to form an image having copy-restriction images embedded therein is received from the user.

Part or all of functions executed by the copying device managing device 3 in the above description may be executed by the image generating device 2. For example, the image generating device 2 stores information for specifying each of commonly known various types of copying devices and information for specifying the type of the copy-restriction image to be detected by this type copying device while associating these pieces of information with each other. In this manner, when the copying device managing device 3 merely specifies the type of each copying device 5 in the image processing system 1 and notifies the image generating device 2 of the specified type, the image generating device 2 can specify the type of copy-restriction image to be detected by each copying device 5.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image processing device comprising:
- an acceptance section that accepts image data to be processed;
- an information acquisition section that acquires first information relevant to a first copy-restriction image that is detectable by a first copying device and not relevant to a second copying device or used by the second copying device for copy restriction, and second information relevant to a second copy-restriction image that is detectable by the second copying device and not relevant to the first copying device or used by the first copying device for copy restriction, the first copying device preventing copying of a target image when the first copying device detects the first copy-restriction image embedded in the target image, and the second copying device preventing copying of the target image when the second copying device detects the second copy-restriction image embedded in the target image;
- a generating section that generates an output image by embedding, in the image data, the first copy-restriction image corresponding to the first information acquired by the information acquisition section and the second copy-restriction image corresponding to the second information acquired by the information acquisition section; and
- an output section that outputs the output image generated by the generating section.

2. The image processing device according to claim 1, wherein the generating section generates the output image by type-by-type embedding at least one part of the first copy-restriction image corresponding to the first information or the second copy-restriction image corresponding to the second information acquired by the information acquisition section in split regions of the image data.

3. The image processing device according to claim 2, wherein the generating section determines areas of the split regions for embedding the copy-restriction images in accordance with the number of copying devices using at least one kind of the copy-restriction images as subjects of detection.

4. The image processing device according to claim 2, wherein the generating section determines positions in the split regions for embedding the copy-restriction images in accordance with the number of copying devices using at least the part of the kinds of copy-restriction images as subjects of detection.

5. The image processing device according to claim 4, wherein the generating section embeds a copy-restriction image which is at least the part of the kinds of copy-restriction images and which the number of copying devices set as subject of detection, in a split region nearer to the center of the image data.

6. The image processing device according to claim 2, wherein the generating section changes an average density of at least one of the kinds of copy-restriction images corresponding to the plural kinds of information acquired by the information acquisition section in accordance with average densities of other types of copy-restriction images, and then embeds the copy-restriction images in the image data.

7. The image processing device according to claim 6, wherein the generating section changes a size of each unit image when the at least one of the kinds of copy-restriction images is formed such that unit images are arranged according to a predetermined rule.

8. The image processing device according to claim 6, wherein the generating section changes a distance between adjacent unit images when the at least one of the kinds of copy-restriction images is formed such that unit images are arranged according to a predetermined rule.

9. An image processing device comprising:
- an acceptance section that accepts image data to be processed;
- an information acquisition section that acquires plural pieces of information relevant to copy-restriction images and corresponding to plural kinds of copying devices configured to detect corresponding copy-restriction images, a target image being prevented from copying when a given piece of the information corresponding to a given kind of the copying devices and embedded in the target image is detected by the given kind of the copying devices;
- a generating section that generates a formation-target image by embedding, in the image data, the copy-restriction images corresponding to the plural piece of information acquired by the information acquisition section;
- an output section that outputs the formation-target image generated by the generating section; and
- an inquiry section that inquires of a storage device for information stored in the storage device, the storage device being configured to store the plural piece of information relevant to the copy-restriction images while associating the plural piece of information with the plural kinds of copying devices,
- wherein the acceptance section accepts designation of one of the copying devices as a destination,
- wherein the information acquisition section acquires information concerned with one of the copy-restriction images corresponding to the destination copying device and information concerned with the other of the copy-restriction images from the storage device when the information concerned with the other of the copy-restriction images than the one of copy-restriction image corresponding to the destination copying device is stored in the storage device as a result of the inquiry by the inquiry section, and
- the output section outputs the formation-target image to the destination copying device.

10. The image processing device according to claim 9, wherein the storage device stores information concerned with a common copy-restriction image as a copy-restriction image which is detectable by the plural kinds of copying devices each supporting respective type of copy-restriction images.

11. The information processing device according to claim 10, wherein the information acquisition section acquires the information concerned with the common copy-restriction image and information concerned with copy-restriction images which is detectable by copying devices not supporting the common copy-restriction image when the common copy-restriction image is stored in the storage device.

12. The image processing device according to claim 9, wherein the generating section generates the formation-target image by type-by-type embedding at least one part of the types of copy-restriction images corresponding to the types of information acquired by the information acquisition section in split regions of the image data, and wherein the generating section determines areas of the split regions for embedding the copy-restriction images in accordance with the number of copying devices using at least one kind of the copy-restriction images as subjects of detection.

13. The image processing device according to claim 9, wherein the generating section generates the formation-target image by type-by-type embedding at least one part of the types of copy-restriction images corresponding to the types of information acquired by the information acquisition section in split regions of the image data, and wherein the generating section determines positions in the split regions for embedding the copy-restriction images in accordance with the number of copying devices using at least the part of the kinds of copy-restriction images as subjects of detection.

14. The image processing device according to claim 9, wherein the generating section generates the formation-target image by type-by-type embedding at least one part of the types of copy-restriction images corresponding to the types of information acquired by the information acquisition section in split regions of the image data, and wherein the generating section changes an average density of at least one of the kinds of copy-restriction images corresponding to the plural kinds of information acquired by the information acquisition section in accordance with average densities of other types of copy-restriction images, and then embeds the copy-restriction images in the image data.

15. An image processing system comprising an image processing device, and a storage device, wherein:

the storage device stores first information relevant to a first copy-restriction image that is detectable by a first copying device and not relevant to a second copying device or used by the second copying device for a copy restriction process, and second information relevant to a second copy-restriction image that is detectable by the second copying device and not relevant to the first copying device or used by the first copying device for a copy restriction process, the first copying device preventing copying of a target image when the first copying device detects the first copy-restriction image embedded in the target image, and the second copying device preventing copying of the target image when the second copying device detects the second copy-restriction image embedded in the target image; and the image processing device includes:

an acceptance section which accepts image data to be processed and which accepts designation of a destination copying device;

an inquiry section which inquires of the storage device;

an information acquisition section which acquires the first information relevant to the first copy-restriction image that is detectable by the first copy device, which corresponds to the destination copying device, and the second information relevant to the second copy-restriction image that is detectable by the second copying device, from the storage device, when the second information relevant to the second copy-restriction image is stored in the storage device as a result of inquiry by the inquiry section;

a generating section which generates an output image by embedding the first copy-restriction image corresponding to the first information acquired by the information acquisition section and the second copy-restriction image corresponding to the second information inquired by the information acquisition section in the image data; and an output section which outputs the output image generated by the generating section to the destination copying device.

16. The image processing system according to claim 15, wherein the generating section generates the output image by type-by-type embedding at least one part of the first copy-restriction image corresponding to the first information or the second copy-restriction image corresponding to the second information acquired by the information acquisition section in split regions of the image data, and wherein the generating section determines areas of the split regions for embedding the copy-restriction images in accordance with the number of copying devices using at least one kind of the copy-restriction images as subjects of detection.

17. The image processing system according to claim 15, wherein the generating section generates the output image by type-by-type embedding at least one part of the first copy-restriction image corresponding to the first information or the second copy-restriction image corresponding to the second information acquired by the information acquisition section in split regions of the image data, and wherein the generating section determines positions in the split regions for embedding the copy-restriction images in accordance with the number of copying devices using at least the part of the kinds of copy-restriction images as subjects of detection.

18. The image processing system according to claim 15, wherein the generating section generates the output image by type-by-type embedding at least one part of the first copy-restriction image corresponding to the first information or the second copy-restriction image corresponding to the second information acquired by the information acquisition section in split regions of the image data, and wherein the generating section changes an average density of at least one of the kinds of copy-restriction images corresponding to the plural kinds of information acquired by the information acquisition section in accordance with average densities of other types of copy-restriction images, and then embeds the copy-restriction images in the image data.

19. A non-transitory computer readable medium storing a program causing a computer to execute a process for image processing, the process comprising:

accepting image data to be processed;

acquiring first information relevant to a first copy-restriction image that is detectable by a first copying device and not relevant to a second copying device or used by the second copying device for a copy restriction process, and second information relevant to a second copy-restriction image that is detectable by the second copying device and not relevant to the first copying device or used by the first copying device for a copy restriction process, the first copying device preventing copying of a target image when the first copying device detects the first copy-restriction image embedded in the target image, and the second copying device preventing copying of the target image when the second copying device detects the second copy-restriction image embedded in the target image;

generating an output image by embedding, in the image data, the first copy-restriction image corresponding to the first information acquired by the acquiring image corresponding to the second copy-restriction image corresponding to the second information acquired by the acquiring step; and outputting the output image generated by the generating step.

20. The non-transitory computer readable medium according to claim 19, wherein the generating generates the output image by type-by-type embedding at least one part of the first copy-restriction image corresponding to the acquired first information or the second copy-restriction image corresponding to the acquired second information in split regions of the image data, and wherein the generating determines areas of the split regions for embedding the copy-restriction images in accordance with the number of copying devices using at least one kind of the copy-restriction images as subjects of detection.

21. The non-transitory computer readable medium according to claim 19, wherein the generating generates the output image by type-by-type embedding at least one part of the first copy-restriction image corresponding to the acquired first information or the second copy-restriction image corresponding to the acquired second information in split regions of the image data, and wherein the generating section determines positions in the split regions for embedding the copy-restriction images in accordance with the number of copying devices using at least the part of the kinds of copy-restriction images as subjects of detection.

22. The non-transitory computer readable medium according to claim 19, wherein the generating generates the output image by type-by-type embedding at least one part of the first copy-restriction image corresponding to the acquired first information or the second copy-restriction image corresponding to the acquired second information in split regions of the image data, and wherein the generating section changes an average density of at least one of the kinds of copy-restriction images corresponding to the plural kinds of information acquired by the information acquisition section in accordance with average densities of other types of copy-restriction images, and then embeds the copy-restriction images in the image data.

* * * * *